(12) United States Patent
Rizzi et al.

(10) Patent No.: US 8,673,232 B2
(45) Date of Patent: Mar. 18, 2014

(54) ISOTHERMAL TUBE REACTOR

(75) Inventors: Enrico Rizzi, Casnate con Bernate (IT);
Ermanno Filippi, Castagnola (CH);
Mirco Tarozzo, Ligornetto (CH);
Fabiano Montini, Taverne (CH)

(73) Assignee: Methanol Casale SA (CH)

( * ) Notice: Subject to any disclaimer, the term of this patent is extended or adjusted under 35 U.S.C. 154(b) by 11 days.

(21) Appl. No.: 13/264,118

(22) PCT Filed: Mar. 25, 2010

(86) PCT No.: PCT/EP2010/053952
§ 371 (c)(1),
(2), (4) Date: Oct. 12, 2011

(87) PCT Pub. No.: WO2010/124916
PCT Pub. Date: Nov. 4, 2010

(65) Prior Publication Data
US 2012/0039762 A1 Feb. 16, 2012

(30) Foreign Application Priority Data

Apr. 29, 2009 (EP) .................. 09159069

(51) Int. Cl.
*F28D 7/00* (2006.01)
(52) U.S. Cl.
USPC ........................ 422/201; 422/200
(58) Field of Classification Search
USPC .............................. 422/200, 201
See application file for complete search history.

(56) References Cited

U.S. PATENT DOCUMENTS

| 3,053,512 | A | | 9/1962 | Soudan et al. |
| 4,357,991 | A | * | 11/1982 | Cameron ................ 165/159 |
| 4,594,227 | A | * | 6/1986 | Ohsaki et al. ............. 422/148 |
| 5,989,500 | A | | 11/1999 | Peacock |
| 2006/0275190 | A1 | | 12/2006 | Filippi |
| 2007/0023173 | A1 | | 2/2007 | Nelson et al. |

FOREIGN PATENT DOCUMENTS

| GB | 827749 A | 2/1960 |
| WO | 93/00159 A1 | 1/1993 |
| WO | 2005/005040 A1 | 1/2005 |

OTHER PUBLICATIONS

International Preliminary Report on Patentability issued in connection with PCT Application No. PCT/EP2010/053952.
Response to Written Opinion dated Apr. 1, 2011 in connection with PCT Application No. PCT/EP2010/053952.
Response to Written Opinion dated Sep. 12, 2011 in connection with PCT Application No. PCT/EP2010/053952.

* cited by examiner

*Primary Examiner* — Lessanework Seifu
(74) *Attorney, Agent, or Firm* — Akerman LLP

(57) ABSTRACT

A tube isothermal chemical reactor (1), comprising a vessel (2) with a central axis (A-A), and an annular tube heat exchanger (40) embedded in a catalytic reaction space, the exchanger (40) comprising a plurality of concentric ranks (10, 11) of tube packs (10*a*), each of said tube packs comprising parallel tubes (30), a respective heat-exchange fluid feeder (20) and a respective heat-exchange fluid collector (21).

9 Claims, 3 Drawing Sheets

ISOTHERMAL TUBE REACTOR

This application is a national phase of PCT/EP2010/053952, filed Mar. 25, 2010, and claims priority to EP 09159069.5, filed Apr. 29, 2009, the entire contents of both of which are hereby incorporated by reference.

FIELD OF THE INVENTION

The invention relates to a novel arrangement of a tube heat exchanger for use in isothermal or pseudo-isothermal chemical reactors. The invention also relates to a chemical reactor equipped with said tube heat exchanger.

PRIOR ART

Isothermal or pseudo-isothermal chemical reactors are reactors equipped with an internal heat exchanger to control the temperature of the reaction zone. In operation, the heat exchanger is fed with an appropriate cooling or heating medium, such as water, steam, etc. . . . and compensates for the heat generated or absorbed by the evolving chemical reaction, respectively exothermic or endothermic. An isothermal reactor can be equipped with a tube heat exchanger or a plate heat exchanger and is correspondingly referred to as tube reactor or plate reactor. Isothermal reactors are for example the reactors for synthesis of methanol, and the shift converters where a synthesis gas is treated to convert carbon monoxide into carbon dioxide.

A common arrangement of a tube reactor has a substantially annular heat exchanger with axial tubes supported by two opposite tube plates (or sheets). This structure has however many drawbacks. The tube sheets are expensive and make servicing difficult. Replacement of damaged tubes and re-charge of the catalyst is difficult because of the monolithic structure of the tube heat exchanger; removing a portion of the tube heat exchanger e.g. for maintenance is generally not possible, because all tubes are firmly secured to the tube sheets. The reactor is required to have large flanges having about the same diameter of the shell, which are expensive and may pose problems of tightness.

SUMMARY OF THE INVENTION

The problem faced by the invention is to provide a more effective system for arranging the tubes of an axial, annular tube heat exchanger in a chemical isothermal reactor.

According to the invention, there is provided a tube isothermal chemical reactor comprising a vessel with a central axis, and an annular tube heat exchanger with a plurality of heat exchange tubes arranged parallel to said axis, said heat exchanger comprising a plurality of heat exchange elements in the form of tube packs, each of said tube packs comprising a bundle of parallel tubes, a respective heat-exchange medium feeder and a respective heat-exchange medium collector, the tubes of each tube pack having opposite ends in fluid communication with the respective feeder and collector, said tube packs being arranged in a plurality of concentric ranks of said annular heat exchanger.

The annular tube heat exchanger is usually embedded in an annular catalytic rack, between an outer cylindrical wall and an inner cylindrical wall. Said tube packs are preferably formed as curvilinear, plate-like elements and each of said elements is extending over a respective sector of a ring of the annular heat exchanger.

In a preferred embodiment of the invention, each of said heat-exchange medium feeders and collectors is formed substantially as a box-shaped body. The box-shaped body is delimited by opposite walls and has an internal room for feeding or collecting the medium to/from the tubes connected to the feeder/collector.

In a more preferred embodiment of the invention, each of said box-shaped bodies comprises a front curved face and a rear curved face, each of said curved faces corresponding to a respective strip of a cylindrical surface; two lateral faces and two upper and lower faces shaped as sectors of a ring surface.

Preferably, the feeder and collector of one single tube pack, which are located at opposite heat exchange medium inlet/outlet sides of the heat exchanger, are substantially identical having the same shape and dimensions. In embodiments of the invention, the feeders and collectors of the tube packs can be differentiated according to the position of the respective tube pack in the annular structure of the exchanger.

In one embodiment, the tubes of each tube pack are arranged in a number of curvilinear, concentric tube ranks centred on the axis of the reactor and annular heat exchanger. The tubes of a tube rank are distributed substantially on an arc of circumference centred on said axis. The number of tube ranks per pack may be constant or variable throughout the exchanger, according to different embodiments of the invention. The tubes in a tube pack may however have different arrangements; in other embodiments, for example, the tubes of each tube pack are distributed with a square or triangular pitch.

Tube packs with a different tube arrangement may be provided in the same heat exchanger. For example, inner and outer tube packs, relative to the central axis of the reactor, may have a respective and specific arrangement of tubes and/or different feeders and collectors.

In a preferred embodiment, the tube packs are staggered in the axial direction, so that the feeders and collectors are also staggered at different levels in the axial coordinate, at the fluid inlet/outlet sides of the heat exchanger. More preferably, the elements are staggered so that the feeders and collectors are alternatively located at least at a first level and a second level, and each feeder or collector located at one level is next to other feeders or collectors located at another level. In preferred embodiments of the invention, the tube packs are staggered by a distance which is equal to or greater than the height of the box-shaped feeders and collectors.

Each tube pack forms a sector of a ring of the annular heat exchanger, being extended over a certain angle relative to the central axis. In first embodiments of the invention, all tube packs cover the same angle, so that sectors of the annular heat exchanger comprise the same number of tube packs. In further embodiments, said angle is varied; preferably the inner tube packs closer to the central axis cover a greater angle than the outer tube packs, so to reduce the overall number of elements. Hence, in a preferred embodiment, the curvilinear tube packs of the heat exchanger comprise at least outer tube packs which are extended over ring sectors corresponding to a first angle centred on the central axis of the reactor, and second inner tube packs which are extended over ring sectors corresponding to a second angle centred on the same axis, the second angle being greater than the first.

An object of the invention is also a heat exchanger for a chemical reactor, according to the above. An object of the invention is a tube heat exchanger for use in an isothermal reactor, the heat exchanger having an annular arrangement with a central axis and tubes parallel to said axis, characterized by comprising a plurality of heat exchange elements in the form of tube packs, each of said tube packs comprising a bundle of parallel tubes, a heat-exchange medium feeder and an opposite heat-exchange medium collector, the tubes of each tube pack having opposite ends in fluid communication with the respective feeder and collector, said tube packs being arranged in a plurality of concentric ranks.

Another object is a tube pack for the manufacture of a modular heat exchanger according to the invention. In particular, an object of the invention is a plate-like heat exchange element for the manufacture of an annular tube heat exchanger, said element comprising a bundle of parallel tubes, a heat-exchange medium feeder and an opposite heat-exchange medium collector, each of said parallel tubes having a first end in fluid communication with the feeder and a second opposite end in fluid communication with the collector, the element being shaped substantially as a sector of a circular ring. Hence, a plurality of such elements can form a ring portion of an annular tube exchanger having a given axis. The tubes of said element, in one embodiment, are arranged in one or more ranks, and each of the tube ranks comprises tubes distributed on concentric arcs of circumference. Preferably said arcs have the centre on said axis of the annular tube exchanger. In alternative embodiments, the tubes of the element are arranged e.g. with a square or triangular pitch.

The inventive tube packs act substantially as modular, plate-like elements. Each tube pack substantially operates as a plate slightly curved in the circumferential direction, covering a given sector of ring in the annular reaction space. Hence, the tube heat exchanger according to the invention has a modular structure comparable to that of plate exchangers, without the need of large and expensive tube sheets. Servicing and replacing of damaged tubes is, for example, much easier than in conventional tube units. Each tube pack can be extracted, serviced or replaced as easily as a heat exchange plate. The tube pack can be extracted and inserted through a relatively small flange, i.e. there is no longer the need of large upper and lower flanges, as in conventional tube sheet units.

The tubes are evenly distributed throughout the whole available reaction space, giving accurate control of the temperature and avoiding e.g. local peaks. Tubes can be mounted close one to the other, obtaining a very uniform heat exchange and the pitch of the tubes can be maintained substantially constant all over the reaction space. But, as another advantage of the invention, the plate-like modular elements are "permeable" to the gaseous flow, thanks to the interspaces between tubes. Due to this feature, the reactants/products mixture evolving through the reaction space is more uniform.

The staggered arrangement of the tube packs, with the fluid inlet/outlet feeders and connectors distributed on two or more levels, is further advantageous in that the catalyst can be discharged and refilled more easily.

The invention then combines the advantages of a tube reactor with the advantages of a plate reactor. These and other advantages will be more evident with the following detailed description of preferred embodiments, as non-limitative example.

DETAILED DESCRIPTION OF PREFERRED EMBODIMENTS

Figure 1:
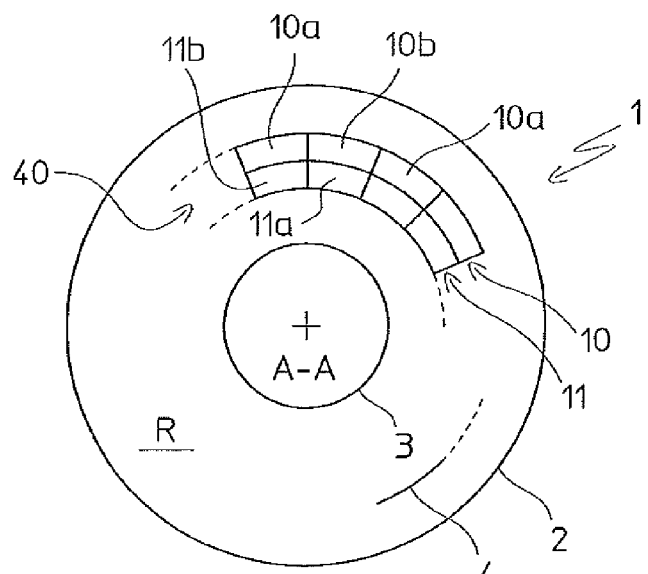
FIG. 1 is a schematic cross section of a reactor according to one embodiment of the invention.

An isothermal chemical reactor 1 comprises a cylindrical shell 2, with a vertical axis A-A. The reactor 1 contains a catalytic rack, delimited by an outer cylindrical wall 4 and an internal tube or duct 3, filled with an appropriate catalyst. An annular reaction space R is then defined inside the reactor 1 between walls 3 and 4. A tube heat exchanger 40 is embedded in the catalytic rack, to provide or remove heat to/from said space R.

The tube heat exchanger 40 has substantially an annular arrangement, comprising axial tubes parallel to the axis A-A and evenly distributed in the space R. The tubes extend from an inlet side to an opposite outlet side of the exchanger 40. For example, the medium enters at the bottom of the reactor 1 and exits at the top.

The heat exchange medium can be any appropriate medium. A common choice will be water or steam. In case the reactor 1 is used for exothermal reactions, the medium may be a liquid which is at least partly evaporated inside the tubes. In the rest of the description, the term fluid will be used with reference to any appropriate heat exchange medium.

The heat exchanger 40 comprises a plurality of modular elements formed substantially as a curved plate-like tube pack, extending in a sector of a respective ring of the annular exchanger 40, and hence of the annular space R. The tube packs are arranged in a plurality of concentric ranks and each rank covers a ring of the annular space R. Two ranks 10 and 11 are shown in FIG. 1. The number of concentric ranks may vary according to dimensions, and may be for example 10 to 15.

Figure 2:
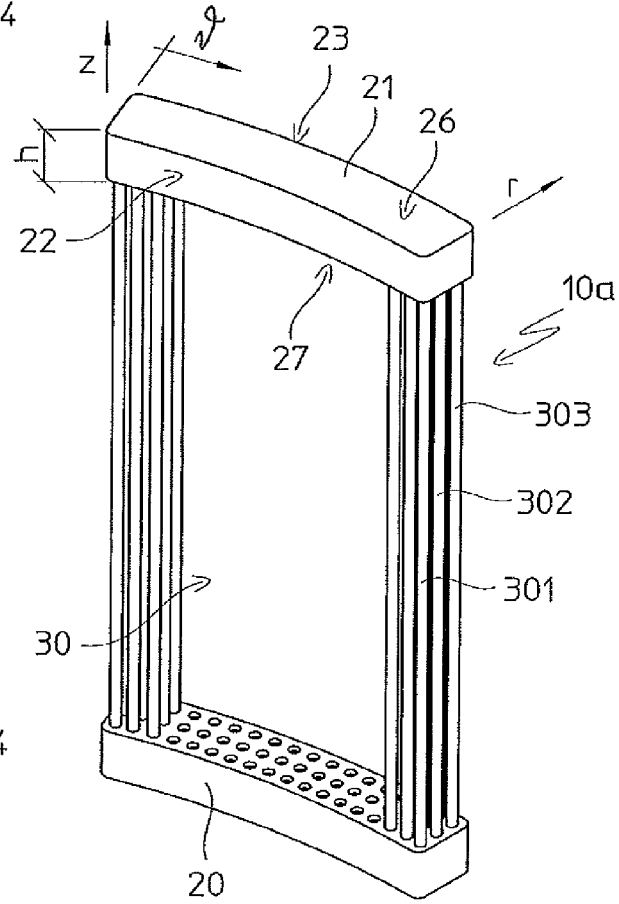
FIG. 2 is a view of a tube pack of the heat exchanger of the reactor of FIG. 1.

One tube pack 10a in a preferred embodiment is depicted in FIG. 2, and basically comprises tubes 30 with opposite ends in fluid communication with a respective heat exchange fluid feeder 20 and a respective fluid collector 21 of the tube pack 10a. FIG. 2 also shows the coordinates r, θ and z of the annular heat exchanger 40 and reaction space R.

The feeders 20 and collectors 21, in a preferred embodiment of the invention, are formed substantially as slightly-curved parallelepiped boxes, having an inner and outer curved face 22, 23, two lateral faces 24 and 25 parallel to the radial direction r, and two upper and lower faces 26, 27 formed substantially as sectors of a ring surface.

Figure 3:
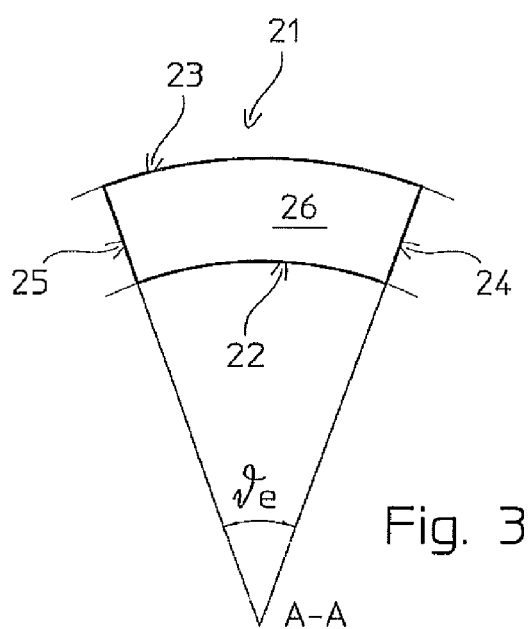
FIG. 3 is a top view of the tube pack of FIG. 2.

Each of the curved faces 22 and 23, as apparent from FIGS. 2 and 3, is substantially a strip of a respective cylindrical surface, corresponding to the inner/outer boundary of the rank 10 where tube pack 10a is located. The lateral and upper/lower faces 24, 25, 26 and 27 are preferably flat.

Each tube pack is extended over a given angle $\theta_e$ (FIG. 3) centred in the central axis A-A. Hence, the cross section of one feeder 20 or collector 21 has a trapezoidal shape as seen in the same FIG. 3, with two curvilinear sides corresponding to said curved faces 22, 23.

The tube packs are preferably staggered in the axial direction z (parallel to A-A), thus being distributed on two or more levels. In the example, the tube packs 10a and 11a, lying respectively on the concentric ranks 10 and 11, are located on a first level, while the tube packs 10b and 11b are located on a second level, so that the tube packs on the first level and the tube packs on the second level are alternated both in the circumferential direction and radial direction. Each feeder or collector 20, 21 positioned on the first level is next to other feeders or collectors, in both coordinates r and θ, which are positioned at the second level. In further embodiments, the tube packs can be staggered on three or more levels. Preferably, the z-staggering of adjacent tube packs is at least equal to the height h of the feeders/collectors 20 and 21 (FIG. 2), or greater.

Figure 4:
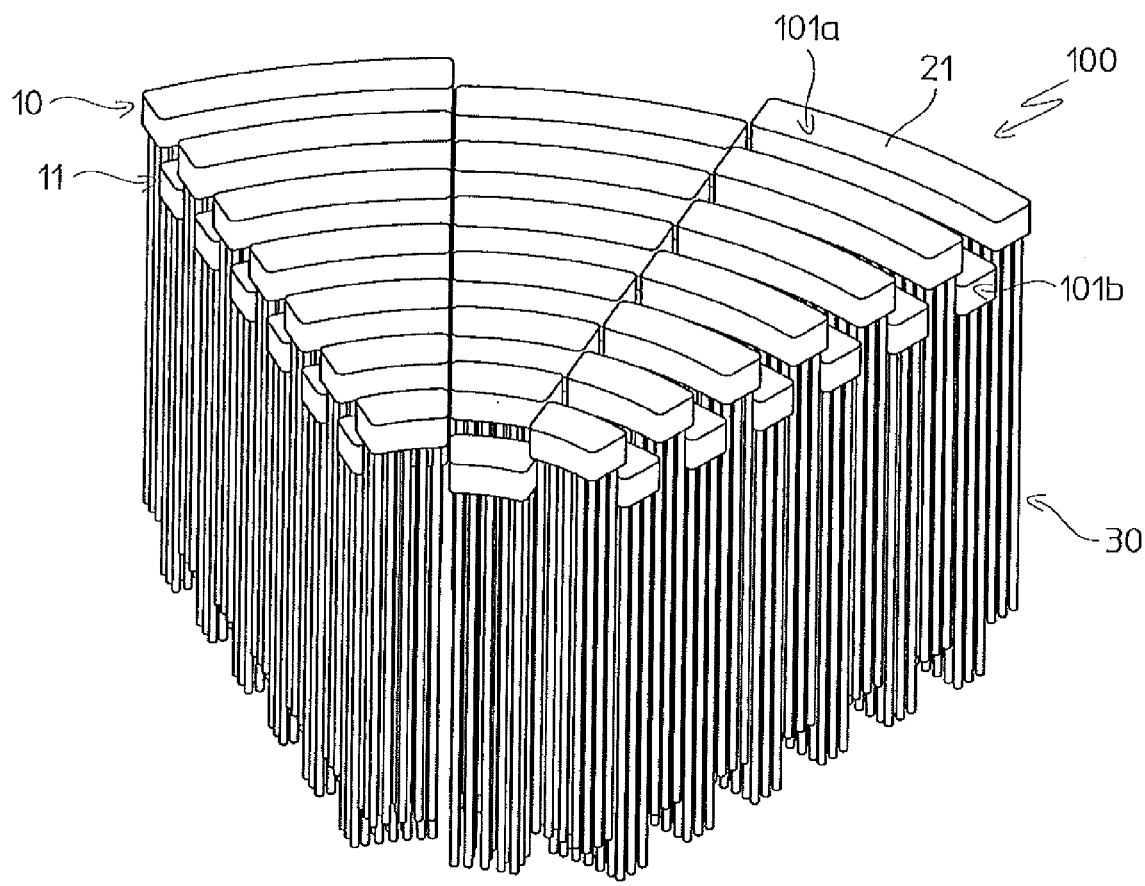
FIG. 4 is a view of a portion of the heat exchanger of the reactor of FIG. 1, showing the plurality of tube packs, in a preferred embodiment of the invention.

FIG. 4 discloses a preferred embodiment of the invention, where the heat exchange tube packs are z-staggered on two levels. Tube pack 101a is on the first level and tube pack 101b is on the second level. A sector 100 of the annular reaction space R is covered, in this example, by thirteen tube packs, alternated on the first and second z-level. FIG. 4 shows a sector of the upper end of the heat exchanger 40. The opposite bottom end of the exchanger 40 is realized in a similar manner.

The angle $\theta_e$ covered by the tube packs can be the same for all tube packs, or in other embodiments different tube packs may have a different angle $\theta_e$. In FIGS. 1 and 4, all tube packs have the same angle $\theta_e$ and each rank of the annular exchanger 40 has the same number of tube packs. As an example, each of tube packs 10a, 10b, 11a, 11b is extended over an angle of 22.5 deg, so that the ranks 10, 11 and the other concentric ranks of the exchanger 40 comprise 16 tube packs each, covering the whole 360 deg angle of the respective ring portion of the space R.

Figure 5:
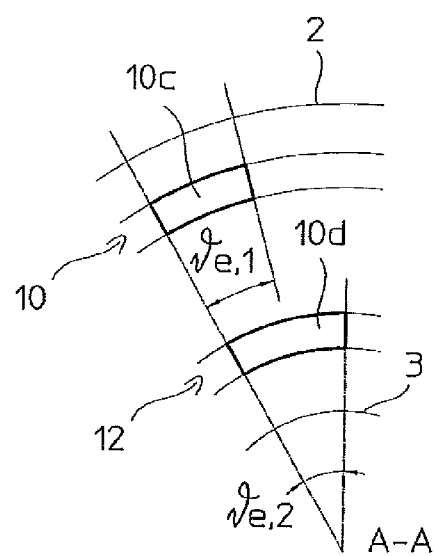
FIG. 5 is a schematic cross section of a reactor according to another embodiment of the invention.

In embodiments where the angle $\theta_e$ is variable, it is preferred that inner tube packs closer to axis A-A are extended over a greater angle than outer tube packs. FIG. 5 is a scheme of an embodiment where tube packs 10c of an outer rank 10 cover a first angle $\theta_{e,1}$ and tube packs 10d of an inner rank 12, closer to the central axis A-A, cover a second angle $\theta_{e,2}$ greater than said first angle. Preferably said second angle is double the first. For example, a variant of the embodiment of FIG. 4 can be realized with a first group of outer ranks of tube packs having $\theta_{e,1}$=22.5 deg, and a second group of inner ranks of tube packs having $\theta_{e,2}$=45 deg.

The tubes 30 of each tube pack can be arranged in a number of curvilinear and concentric ranks, centred on the axis A-A. In the example of FIG. 2, the tube pack 10a has three ranks of tubes; tube 301 is one of the tubes of the first rank, tube 302 is on the second rank and tube 303 is on the third rank. It can be appreciated that the pitch of the tubes in the whole space R can be maintained substantially constant, or within a small tolerance such as +/−1 mm.

Figure 6:
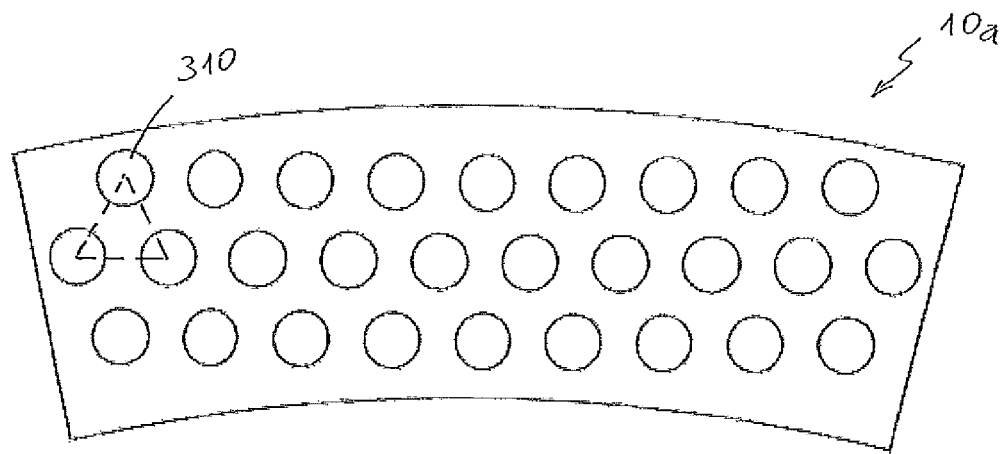
FIGS. 6 and 7 show a cross section of further embodiments of a tube pack according to the invention.
Figure 7:
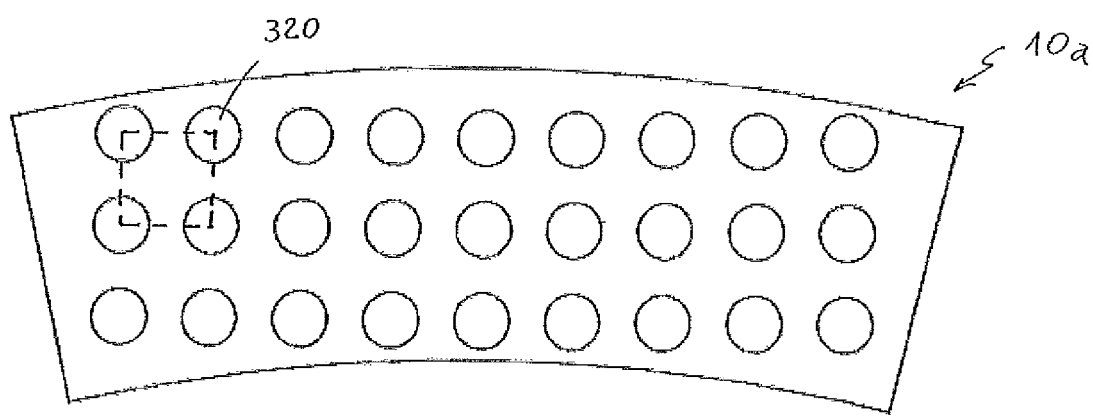

Alternative arrangements of the tubes 30 in a tube pack are shown in FIGS. 6 and 7. In FIG. 6, the tube pack 10a has tubes 310 arranged with a triangular pitch, as indicated by the dotted line. In FIG. 7, the tube pack 10a has tubes 320 arranged with a square pitch.

The feeders 20 and collectors 21 are connected with means for distributing and collecting the heat exchange medium, which are per se known and not described in detail. As an example, each of box-shaped feeders and collectors 20, 21 may be connected with a respective piping to an annular feeding or collecting pipe. Appropriate fluid inlet/outlet flanges or connections will be provided through the shell 2.

A preferred application of the invention is a methanol converter where the tube heat exchanger 40 serves to remove the heat of the methanol synthesis reaction. Cooling water is fed to the bottom feeders 20 and evaporates through the tubes 30 of the tube packs, thus removing the heat produced by the methanol synthesis reaction, and providing accurate control of the temperature of products and reactants throughout the space R. A water/steam mixture is collected at the collectors 21, which operates also as equalizers.

The invention is equally advantageous in axial-flow, radial-flow or axial/radial isothermal chemical reactors and is also applicable to any reactor with an internal heat exchanger which operates immersed in a fluid.

The invention claimed is:

1. A tube isothermal chemical reactor, comprising:
   a vessel with a central axis,
   an annular reaction space defined inside said vessel, and
   an annular tube heat exchanger with a plurality of heat exchange tubes arranged inside said annular reaction space, parallel to said axis,
   said heat exchanger comprising a plurality of heat exchange elements in the form of tube packs, each of said tube packs comprising
   a bundle of parallel tubes,
   a heat-exchange medium feeder and
   a heat-exchange medium collector,
   the tubes of each tube pack having opposite ends in fluid communication with the respective feeder and collector,
   wherein said tube packs are arranged in a plurality of concentric ranks of said annular heat exchanger,
   wherein said tube packs are curvilinear, plate-like elements, and
   wherein each tube pack forms a sector of a ring of said annular heat exchanger.

2. The reactor according to claim 1, said heat-exchange medium feeders and heat-exchange medium collectors being formed substantially as box-shaped bodies.

3. The reactor according to claim 2, said box-shaped bodies comprising:
   a front curved face and a rear curved face corresponding to respective strips of cylindrical surfaces;
   two lateral faces, two upper and lower faces shaped as sectors of a ring surface.

4. The reactor according to claim 1, the tube packs being staggered in the axial direction, so that the heat exchange medium feeders and collectors are also staggered at different levels according to an axial coordinate of the reactor, at the fluid inlet/outlet sides of the heat exchanger.

5. The reactor according to claim 4, the tube packs being staggered so that the feeders and collectors are alternatively located at least at a first level and a second level, so that each feeder or collector located at one level is next to other feeders or collectors located at another level.

6. The reactor according to claim 5, the tube packs being staggered by a distance which is equal to or greater than the height of the feeders and collectors.

7. The reactor according to claim 1, where the curvilinear tube packs of the heat exchanger comprise at least outer tube packs which are extended over ring sectors corresponding to a first angle centred on the central axis of the reactor, and second inner tube packs which are extended over ring sectors corresponding to a second angle centred on the same axis, the second angle being greater than the first.

8. The reactor according to claim 1, each tube pack comprising heat exchange tubes arranged in a plurality of curvilinear and concentric ranks centred on the central axis of said reactor.

9. The reactor according to claim 1, each tube pack comprising tubes arranged in a triangular pitch or square pitch.

* * * * *